United States Patent [19]

Gray et al.

[11] Patent Number: 5,003,317
[45] Date of Patent: Mar. 26, 1991

[54] STOLEN VEHICLE RECOVERY SYSTEM

[75] Inventors: Donald R. Gray, Carmel, Ind.; Robert L. Gendler, Tamarac, Fla.

[73] Assignee: Mets, Inc., Ind.

[21] Appl. No.: 378,593

[22] Filed: Jul. 11, 1989

[51] Int. Cl.⁵ ............................................. G01S 3/02
[52] U.S. Cl. ................................... 342/457; 342/465
[58] Field of Search ................ 342/457, 465, 463, 450

[56] References Cited

U.S. PATENT DOCUMENTS

| | | | |
|---|---|---|---|
| 4,177,466 | 12/1979 | Reagan | 342/456 |
| 4,651,157 | 3/1987 | Gray et al. | 342/389 |
| 4,742,357 | 5/1988 | Rackley | 342/463 |
| 4,908,629 | 3/1990 | Apsell et al. | 342/457 |

*Primary Examiner*—Theodore M. Blum
*Attorney, Agent, or Firm*—Bryan, Cave, McPheeters & McRoberts

[57] ABSTRACT

A stolen vehicle recovery system (20) in which a vehicle transceiver (30) is disposed on each vehicle (28) for cyclically transmitting a pulsed signal which is modulated by a data stream comprising a verification code, a unique identity code associated with the vehicle (28), and a code which corresponds to whether the detected vehicle (28) is moving or stationary. The vehicle transceiver (30) is automatically activated if a proper authorization signal is not provided to the transceiver (30) by a verification unit. A scanning receiver (42) decodes the pulsed signal and provides the information to a control processor (40) which, in turn, sets remote direction finding receivers (44, 46, 48), set up in a triangulation antenna array, to the appropriate channel. The D.F. receivers (44, 46, 48) measure the bearing, signal strength and time variation, as well as the vehicle identity code, and pass it back to the control processor (40) which, after verification of the identity code, passes this positional information on to a mapping and display computer (50) at the central station (22) which, thereafter, provides a digitized street or terrain map display with the vehicle position and identity code being dynamically displayed thereon. The map may be zoomed through a hierarchical geographical display. The system (20) may be used with multiple vehicles in the same detection area with the channel being divided into a plurality of sub-channels and a composite map display dynamically showing all stolen vehicles (28) in the detection area. Mobile tracking (110, 112, 114, 116, 118, 120, 122) may al be used. In addition, the transceiver (30) can be remotely activated or deactivated, and overlapping detection areas can be provided to cover a larger area. When the transceiver (30) is initially activated, the verification code is set to an unverified state and is changed to a verified state, after confirmation of stolen status, by a command sent from the command transmitter (52).

43 Claims, 7 Drawing Sheets

ZONE 1 - WITHIN 3 MILES OF 2 SITES
ZONE 2 - WITHIN 6 MILES OF 2 SITES
ZONE 3 - WITHIN 9 MILES OF 2 SITES

5,003,317

STOLEN VEHICLE RECOVERY SYSTEM

CROSS-REFERENCE TO RELATED APPLICATIONS

The present invention is related to our commonly owned U.S. Pat. Nos. 4,651,157 and 4,791,572, naming us as joint inventor thereof, and the commonly owned pending U.S. patent application entitled "A Method for Accurately Updating Positional Information Provided on a Digital Map" bearing U.S. Ser. No. 07/176,163, filed, Mar. 31, 1988, the contents of which are specifically incorporated by reference in their entirety.

FIELD OF THE INVENTION

The present invention relates to the field of vehicle monitoring and tracking, and more particularly to stolen vehicle recovery systems for monitoring single or multiple stolen vehicles in a composite digitized map display at the central station.

DESCRIPTION OF THE PRIOR ART

Vehicle tracking or monitoring systems are well known in the art, such as disclosed in our Previous U.S. Pat. No. 4,651,157 and in U.S. Pat. No. 4,177,466. In addition, systems for accurately displaying positional information on a map are also well known in the art, such as described in our previous U.S. Pat. No. 4,791,572 and the co-pending U.S. patent application Ser. No. 07/176,163 incorporated by reference herein. However, none of the prior art systems known to applicants provides an integrated system capable of providing a pulsed transmission unique to each vehicle automatically initiated upon theft of the vehicle, with or without transmission of a verification code which enables verification of vehicle theft, or one which uses sub-channels to enable multiple vehicles to be tracked in a single designated area such as on a common map display. Moreover, the system described in U.S. Pat. No. 4,177,466, for example, provides for broadcasting a continuous signal only in response to a remote activation signal sent to a vehicle transmitter which causes the broadcast to start. In addition, such prior art systems do not allow for tracking of the vehicle until a command signal is first sent from a remote site, thereby decreasing the chances of early recovery as well as the opportunity to immediately monitor the use of the stolen vehicles, such as its possible use in the commission of a crime, or a late night theft which might not initially be discovered by the owner until several hours after its occurrence. These disadvantages of the prior art are overcome by the present invention.

SUMMARY OF THE INVENTION

A stolen vehicle recovery system is provided in which a vehicle transceiver is disposed on each vehicle for cyclically transmitting a pulsed signal which is modulated by a data stream comprising a verification code, a unique identity code associated with the vehicle, and a code which corresponds to whether the detected vehicle is moving or stationary. The vehicle transceiver is automatically activated if the proper authorization signal is not provided to the transceiver by a verification unit, such as a keypad. A scanning receiver decodes the pulsed signal and provides the information to a control processor which, in turn, sets remote direction finding receivers, set up in a triangulation pattern, to the appropriate channel. The direction finding receivers measure the bearing, signal strength, and time variations, as well as the vehicle identity code, and pass it back to the control processor. After verification of the identity code, the control processor passes this positional information on to a mapping and display computer located at a central station. Thereafter, the mapping and display computer provides a digitized street or terrain map display with the vehicle position and identity code being dynamically displayed thereon. The map may be zoomed through a hierarchical geographical display. The system may be used with multiple vehicles in the same detection area with the assigned channel being divided into a plurality of sub-channels and a composite map display dynamically showing all stolen vehicles in the detection area. Mobile tracking may also be used. In addition, the transceivers can be remotely activated or deactivated, and overlapping detection areas can be provided to cover a larger area. In order to avoid the potential for false alarms, when the transceiver is initially activated, the verification code is set to an unverified state and is only changed to a verified state after confirmation of the stolen status of the vehicle, such as by checking with the owner, and thereafter, the transmission of a command signal from the command transmitter which changes the verification state of the verification code.

DETAILED DESCRIPTION OF THE PREFERRED EMBODIMENT

Figure 1:
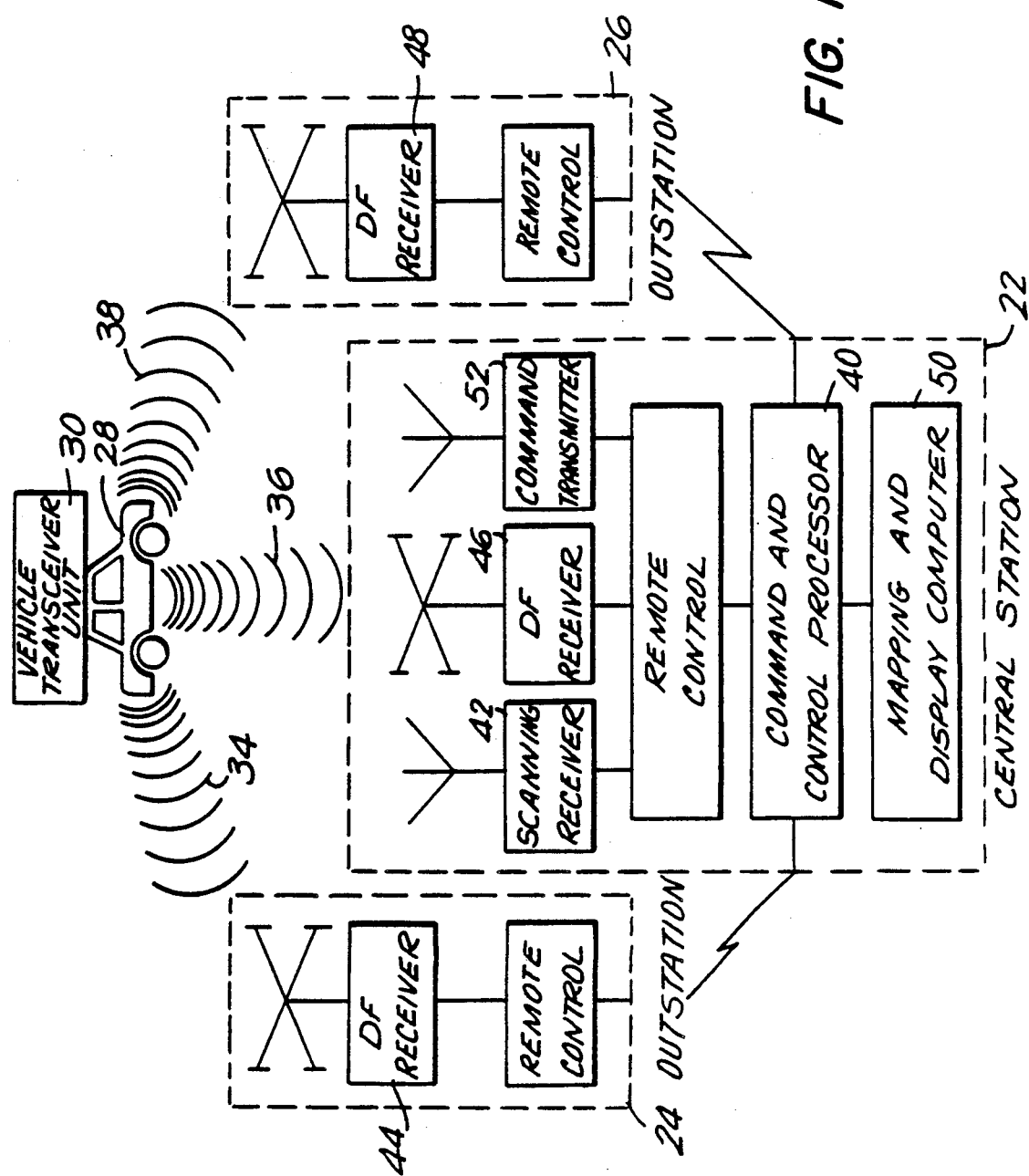
FIG. 1 is a block diagram of a single area system in accordance with the present invention.
Figure 9:
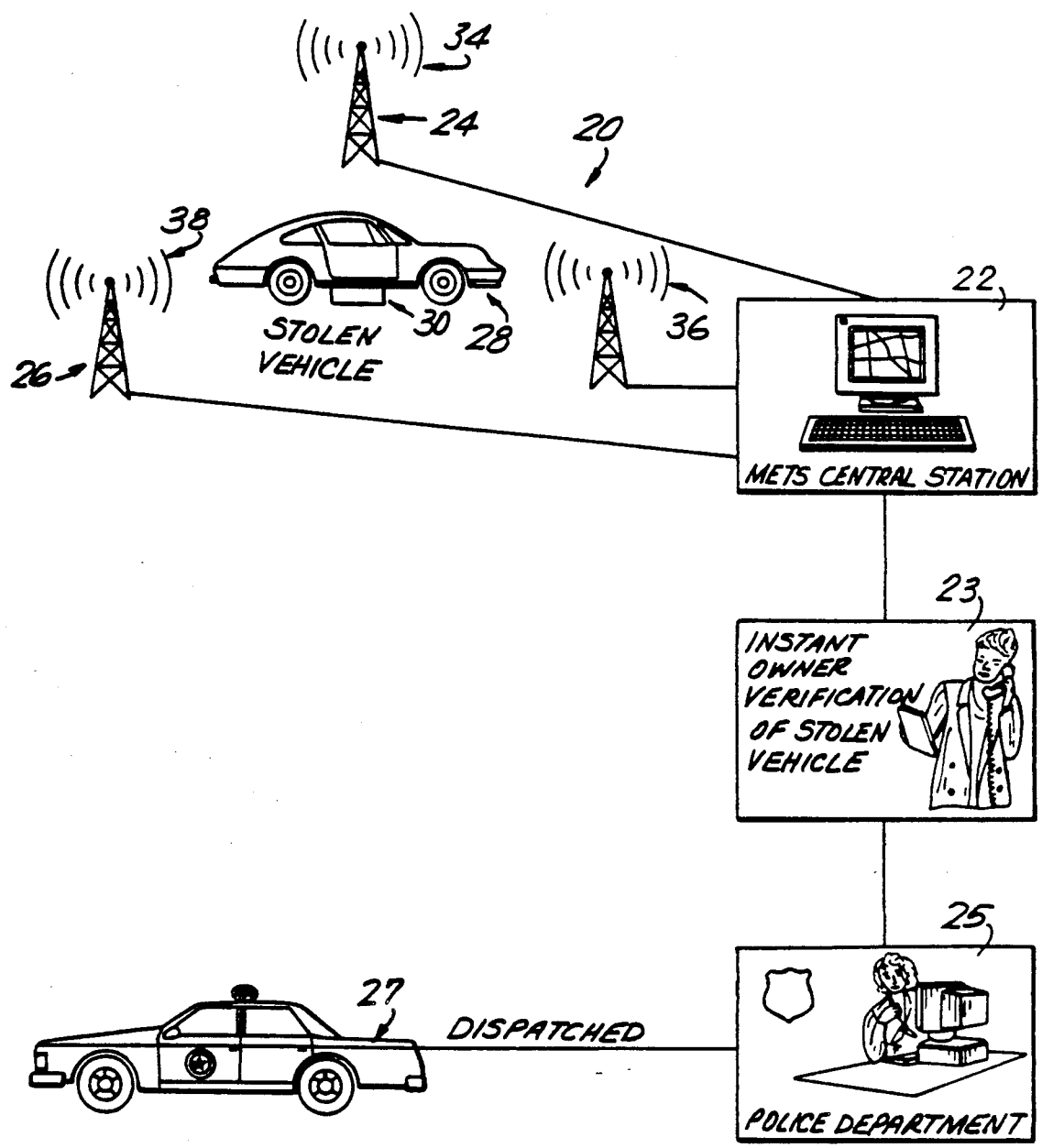
FIG. 9 is an illustrative diagram of the overall stolen vehicle recovery network of the present invention employing owner verification of the stolen vehicle.

Referring now to the drawings in detail and initially to FIG. 1, a block diagram of a typical single area sytem in accordance with the present invention is shown and is generally given reference numeral 20. As shown and preferred in FIG. 1, the basic system 20 preferably includes a central station 22, and a pair of out stations 24 and 26 which, as will be described in greater detail hereinafter, together with central station 22, enable triangulation to detect the position of a stolen vehicle, such as the vehicle represented by reference numeral 28 in FIG. 1. Each vehicle 28 in the system 20 is preferably fitted with a commandable vehicle transceiver unit 30, to be described in greater detail hereinafter. The transceiver unit 30 is preferably able to recognize a legitimate or authorized driver through deactivation methods. If an unauthorized driver is using the vehicle 28, then the transmitter 32 (FIG. 2) contained in the vehicle transceiver unit 30 is preferably initially automatically activated. The transmitted signal which is then provided from the vehicle transceiver unit 30, such as diagramatically represented by signals 34, 36, and 38 in FIG. 1, is preferably modulated by a data stream which includes the vehicle identity code, which is preferably unique to each vehicle in the system 20, a verification of stolen code, a movement code, and a relay contact condition code. With respect to the verification code, when the transceiver unit transmitter 32 is initially activated by a failure to disarm the vehicle sensor, it isn't the verification code is set to an unverified state. Verification of the stolen status of the vehicle 28 may then be confirmed by prompt, direct contact with the vehicle 28 owner, such as illustrated in FIG. 9 by reference numberal 23. Once it has been confirmed that the vehicle 28 has been stolen, a command may then be sent from the command transmitter 52 at the central station 22, via, the command and control processor 40, which then sets the verification code to a verified state indicating that vehicle 28 has been stolen. Of course, if no such verification is needed in the system 20, then this procedure may be omitted and the data stream used to modulate the transmitter 32 can omit transmission of a verification code so that the vehicle 28 will automatically be tracked as a stolen vehicle from its inception of the transmission from transceiver unit 30. In either event, the initial transmission can also initiate a recording of the tracking of the vehicle 28 so that the central station 22 may have a permanent stored record of the vehicle 28 movement until such time as the status of the vehicle 28 is confirmed as stolen. Thereafter, the entire tracking history of the vehicle 28 can be displayed from the time that the vehicle 28 was initially moved from its original location. This would facilitate locating vehicles 28 whose confirmation of theft does not occur until several hours or days after the theft or would assist in tracking the use of stolen vehicles 28 in a crime if such use occured before the vehicle 28 was reported as stolen. These advantages are not possible in prior art systems, such as the prior art system described in U.S. Pat. No. 4,177,466.

Figure 5:
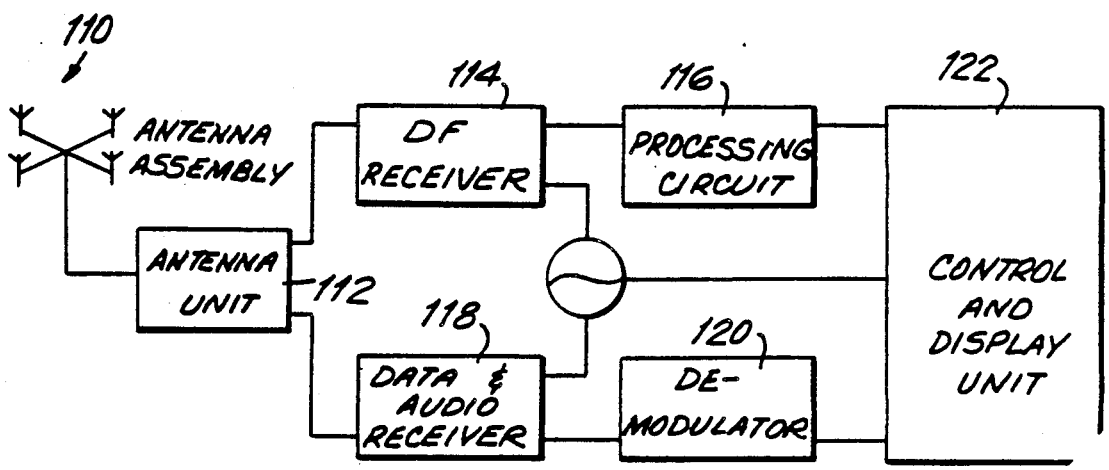
FIG. 5 is a block diagram of a typical mobile target tracker that may be used in accordance with the present invention.

The modulated signal transmitted from the vehicle 28 via the vehicle transceiver unit 30, is preferably picked up by the scanning receiver 42 which decodes the signal and passes the information on to the command and control processor 40 by direct line or radio link. The command and control processor 40 then preferably sets the three direction finding receivers 44, 46, and 48 to the appropriate channel to monitor the movement of the vehicle 28. The direction finding receivers or DF receivers 44, 46, 48 preferably measure the bearing, the signal strength, the time-variation or confidence of the bearing, as well as the unique identity code of the detected vehicle 28 which, after confirmation and change of state of the verification code, may be designated as a stolen vehicle. This information is then passed on to the command and control processor 40 again by direct line or radio link. The command and control processor 40 then preferably verifies the unique identity code of the vehicle 28 and passes the bearing and signal strength details on to the mapping and display computer 50, such as the type of mapping and display computer 50 described in our prior U.S. Pat. No. 4,791,572, the contents of which are specifically incorporated by reference herein, and in our co-pending U.S. patent application Ser. No. 07/176,163 entitled "A Method For Accurately Updating Positional Information Provided On A Digital Map", the contents of which are also specifically incorporated by reference herein. As described in the aforementioned patent and patent application, the mapping and display computer 50 preferably plots the location of the detected or stolen vehicle 28. The description and details of the vehicle 28 and the owner are preferably obtained from the data base of the mapping and display computer 50 and can be used to contact the owner and verify that the vehicle 28 has been stolen and to pass information on to the police department and mobile tracking units if such units are employed in the system 20. Once verified that the vehicle 28 is stolen, as previously mentioned, the verification code is set to the verified state and a direct link may be established with police dispatch and a mobile tracking unit or units can be directed to the location. Each mobile tracking unit, such as shown in FIG. 5, is preferably equipped with a direction finding system which indicates the bearing of the vehicle transceiver 30 as well as the identity code. Once located and apprehended, the vehicle transmitter 32 can be remotely switched off, if desired, by the command transmitter 52 which is controlled by the operator at the central station 22 via the command and control processor 40 which controls the command transceiver 52.

Figure 2:
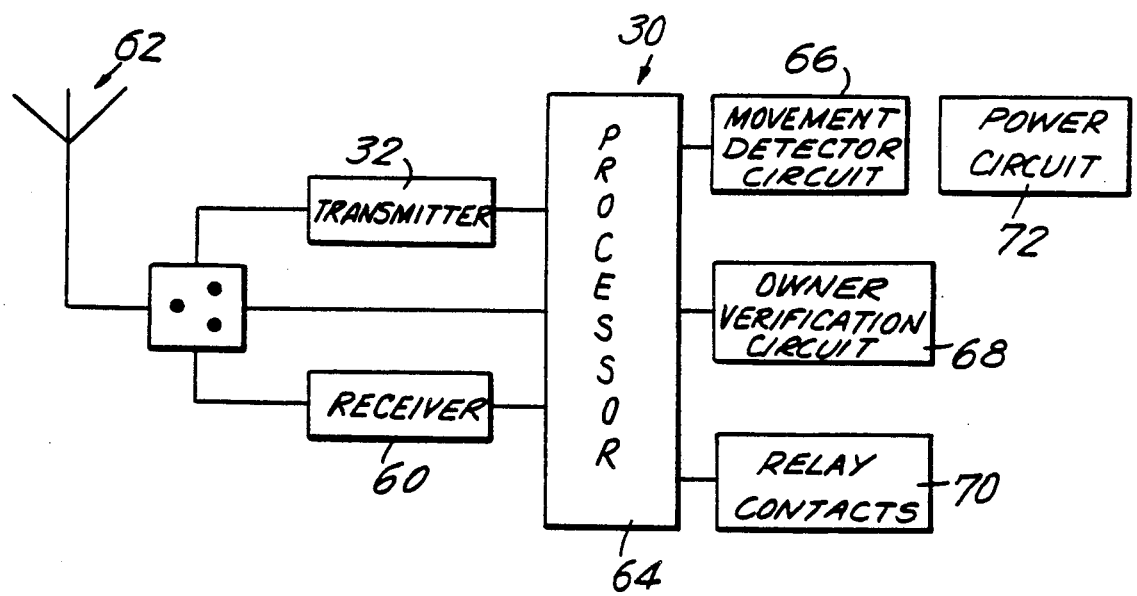
FIG. 2 is a block diagram of a typical vehicle transceiver unit in accordance with the present invention.

Referring now to FIG. 2, a block diagram of a typical vehicle transceiver unit 30 is shown. The vehicle transceiver unit 30 is preferably a commandable target which can be controlled by the command transceiver 52 at the central station 22 to switch the transceiver 30 on and off. Normally, however, the transceiver 30 is only activated when the owner verification circuit 68 detects that an unauthorized driver is using the vehicle 28. When activated, the transceiver 30 transmits a pulsed signal of length T1 seconds every T2 seconds. The transmitted signal from the transmitter 32, as was previously mentioned, is preferably modulated by a unique vehicle identity code, the verification code, and a code which corresponds to whether the vehicle 28 is moving or stationary. In addition, a relay contact condition code may also be provided in the data stream which is used to modulate the transmitter 32. When not transmitting, the receiver section 60 of the vehicle transceiver unit 30 is preferably active and can be used to remotely control the actions of the vehicle transceiver unit 30. Coded signals from the command transmitter 52 at the central station 22 are preferably able to activate or deactivate the pulsed transceiver 30. As an option, if desired, relay contacts can be remotely closed or opened by command which can be used, for example, for several functions such as deactivating the vehicle 28 engine, illuminating a light, sounding an alarm, etc. In such an instance, the aforementioned relay contact condition code would be part of the data stream used to modulate the transmitter 32. The vehicle transceiver unit 30 has the transmitter 32 and the receiver 60 preferably on the same frequency channel and they share a common antenna input 62. Preferably, the vehicle transceiver unit 30 is concealed on the vehicle 28 and is able to be powered by internal batteries and/or the vehicle battery supply. As is further shown and preferred in FIG. 2, vehicle transceiver unit 30 also comprises a processor 64, a movement detector circuit 66, an owner verification circuit 68, the optional relay contacts 70, and, of course, a power circuit 72.

Figure 3:
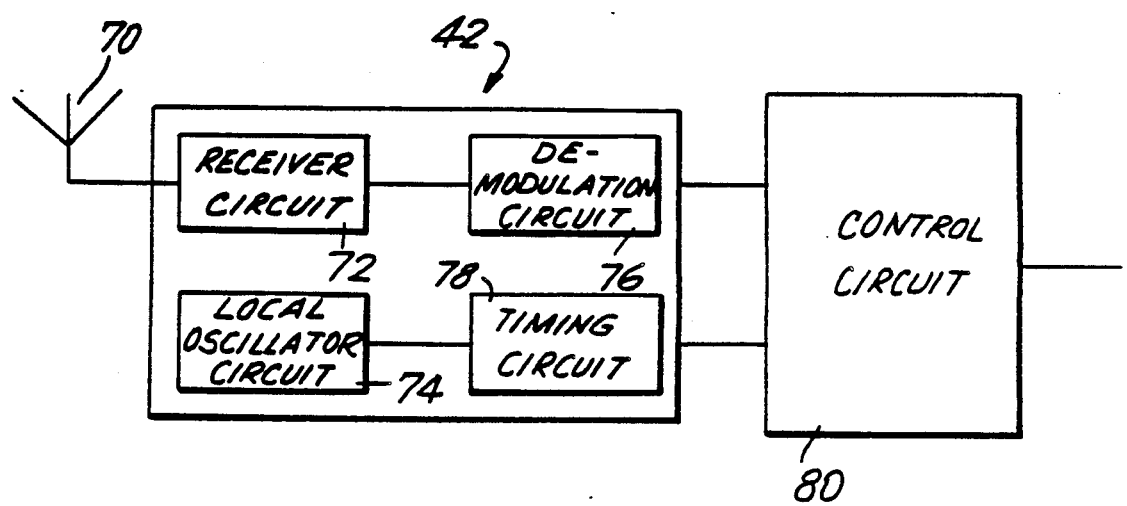
FIG. 3 is a block diagram of a typical scanning receiver in accordance with the present invention.

Referring now to FIG. 3, a block diagram of a typical scanning receiver 42 is shown. The scanning receiver 42, on a continual basis, is tuned in sequence to each of the sub-channel frequencies in the system 20. The dwell time on each channel T3 is preferably slightly longer than time T2, which is the vehicle transceiver unit 30 pulse repetition time. If a signal is received by the scanning receiver 42, it is preferably decoded, and the details of the resulting code and the channel are sent on to the command and control processor 40 at the central station 22. As shown and preferred in FIG. 3, the scanning receiver 42 preferably comprises an antenna 70, a receiver circuit 72, a local oscillator circuit 74, a demodulation circuit 76 connected to the receiver circuit 72, a timing circuit 78 connected to the local oscillator circuit 74, and a control circuit 80.

The command and control processor 40, is preferably the central focus of the system 20 and follows a sequence of events in order to check and locate the stolen vehicle 28 with the command and control processor 40 preferably being a conventional micro computer based unit, conventionaly programmed in order to accomplish this function. The prefered sequence of events is as follows. The code and channel detail of an active vehicle transceiver unit 30 are, as was previously mentioned, preferably received from the scanning receiver 42. The command control processor 40 then preferably checks whether the received signal relates to a newly active vehicle transceiver unit 30 or one that it has been previously tracking. If the received signal relates to a newly active vehicle transceiver unit 30, then the identity code associated with the vehicle transceiver unit 30 is sent to the mapping and display computer 50 which, as was previously mentioned, is a conventional computer, conventionaly programmed to carry out the mapping and display function. The direction finding receivers 44, 46, 48 are then preferably set by the command control processor 40 to the corresponding channel frequency associated with the newly active vehicle transceiver unit 30. The direction finding receivers 44, 46, and 48 are then interrogated by the command and control processor 40 and, in response to such interrogation, respond with the code associated with the vehicle 28 identity and the associated movement code indicating whether the vehicle 28 is stationary or moving, the bearing, the signal strength and the confidence of their respective received signals.

In addition, the verification code is initially received and is set to unverified as was previously mentioned. Verification of the stolen status of the newly active vehicle transceiver unit 30 is then confirmed by prompt, direct contact with the vehicle 28 owner, by way of example. Once it has been confirmed that the vehicle 28 has been stolen, a command is then sent from the command transmitter 52 which sets the verification code to verified. In addition, the command and control processor 40, checks the identification code and if they correspond to a previously identified active transceiver unit 30, the full details are passed on to the mapping and display computer 50. As previously, mentioned, this information may also be passed on to the police dispatch mapping and display computer such as illustrated by reference numeral 25 in FIG. 9, but, preferably, this is only accomplished after customer verification 23 and the change of the verification code from an unverified state to a verified state so as to eliminate the possibility of false alarms. Of course, if desired, police vehicles 27 may be equipped with mobile target trackers, which, if within range of an active vehicle transceiver unit 30, could display the bearing, identification code and verification code status of the vehicle 28. Thus, the policeman would know whether the vehicle 28 had been confirmed as being stolen or not and would have the option of either tracking the vehicle 28 or not. In addition, the verification code, if desired, could be used by a mobile tracking unit so as to inhibit any display if the verification code was in an unverified state so that nothing would appear on the monitor. If desired, the verification code status could be identified using colored lights such as a green LED for a verified state and a red LED for an unverified state. With respect to the command and control processor 40 itself, however, preferably this unit 40 will continue to track the vehicle 28 whether it is verified or unverified and will continue to repeat the steps of interrogating the direction finding receivers 44, 46 and 48, checking the identification codes of the received signals, and passing this information on to the mapping and display computer 50 for appropriate display and mapping of the vehicle 28 being tracked. Thus, during the period of time that the vehicle transceiver unit 30 is transmitting in an unverified state, the system 20 could record and store data concerning the location and movement of the vehicle 28 without initially providing this information to police dispatch unless requested. If the vehicle 28 is later confirmed to have been stolen, the data concerning the recent whereabouts of the vehicle 28 can be useful to the police in linking the vehicle 28 to crimes that may have been committed and to suspects.

If more than one vehicle transceiver unit 30 is active, then the command and control processor 40 will set the direction finding receivers 44, 46 and 48, in turn, preferably to the corresponding channels which, as previously mentioned are in reality sub-channel frequencies in the system 28. The direction finding receivers 44, 46 and 48 preferably effectively scan the active channels, dwelling for T3 seconds on each active channel. The details of all of the received signals on each channel are preferably sent to the command and control processor 40. By checking the identity codes, the command and control processor 40 is preferably able to identify clashes between different vehicle transceiver unit 30 transmissions that are sharing a common channel. Under operator control, the command and control processor 40 also preferably controls the operation of the command transmitter 52 which, when desired, can be set to an appropriate channel and data passed to it corresponding to codes which, when transmitted, will cause a chosen vehicle transceiver unit 30 to be controlled, such as to turn the transmitter 32 on or off, or to turn relay contacts 70 on or off.

The command transmitter 52 is preferably, as previously mentioned, to remotely control functions of the vehicle transceiver unit 30. It is used, under operator control, primarily as a means of turning its associated transceiver unit 30 off when the stolen vehicle 28 has been recovered, but can also be used to switch the transmitters 32 on and off if desired, as a means of controlling the contention or clashing of the transmissions from the vehicle transceiver units 30. For example, if two vehicle transceiver units 30 are active on a common channel, they may be switched on and off in order to simplify the operations. The address code for the vehicle transceiver unit 30 will preferably differ from the vehicle identity code for security reasons.

The mapping and display computer 50 is preferably based on the computerized mapping and interactive database used by Mets Inc., the assignee of this application, in its commercially available Fleet Management System, and such as described in the aforementioned U.S. Patents and copending Patent Application commonly owned by Mets Inc., incorporated by reference herein. The identity code of the active vehicle transceiver unit 30, as was previously mentioned, is passed on to the mapping and display computer 50. Suffice to say that the data base, as is used in the commercially available METS computerized mapping and interactive data base Fleet Management System, is interrogated and the full details of the vehicle 28 and the owner are presented to the operator. Normally, attempts would then be made to contact the owner of the vehicle 28 so as to verify that an unauthorized person is driving the vehicle so that the verification code can be changed from an unverified state to a verified state, as was previously mentioned. Once this has been accomplished, the verification code remains in a verified state throughout the monitoring process until the vehicle transceiver unit 30 is turned off or the vehicle 28 is recovered. As previously mentioned, when confirmed, this information may then be passed to the appropriate authority, such as the police department. The details from the direction finding receivers 44, 46, and 48, verified by the command and control processor 40, are, as previously mentioned, preferably processed by the mapping and display computer 50 and displayed on the appropriate terrain map. Algorithms which use the data on bearings, signal strength and confidence, together with historical data, preferably plot the position of the stolen vehicle 28 together with identity on the multi-level digitized map, such as described in the aforementioned commonly owned patents and co-pending patent application and in the commercially available METS Fleet Management System. The facilities of the mapping system preferably provide the operator with other functions such as map zooming, address matching, routing programs, such as for example posted route for mobile target tracker, superimposition of other data, such as police vehicle mobile trackers etc., plotting of the stolen vehicle's route, and a rerun facility and memory of activity. All of these are possible through conventional programming employing the systems described in the aforementioned patents and co-pending application and the commercially available METS Fleet Management System. If desired, the functions of the command and control processor 40 and the mapping and display computer 50, although represented as separate modules in FIG. 1, may be combined in a single computer system.

Figure 4:
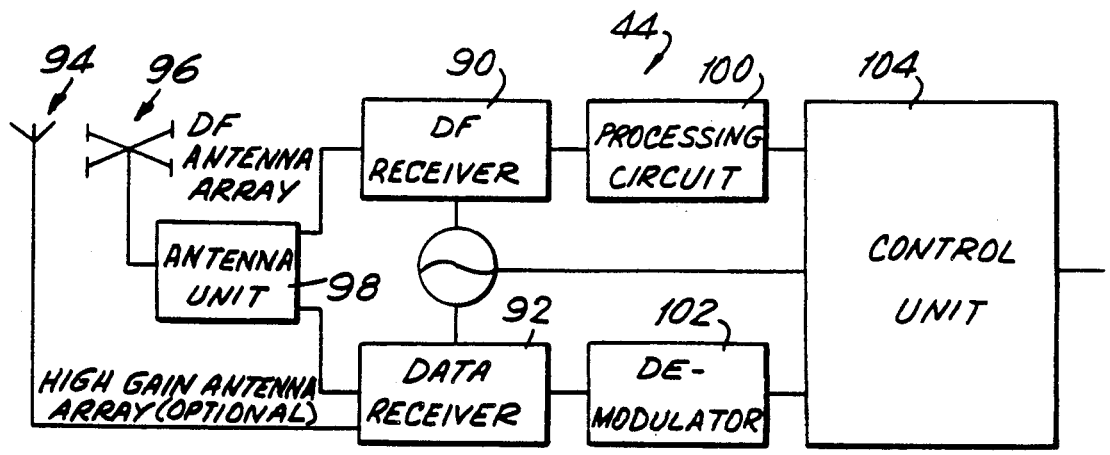
FIG. 4 is a block diagram of a typical direction finding receiver station in accordance with the present invention.

Referring now to FIG. 4, a typical direction finding receiver station such as 44, 46 or 48, in accordance with the present invention is shown. Taking direction finding receiver 44 by way of example, the direction finder receiver station 44 preferably measures the bearing of the received signal from the active vehicle transceiver units 30. As was previously mentioned, the channel frequency is preferably controlled by the command and control processor 40. As shown and preferred in FIG. 4, the direction finding receiver station 44 preferably actually consists of two receivers 90, 92 which share a common local oscillator. These two receivers are the direction finding receiver 90 and the data receiver 92. The direction finding receiver 90 preferably determines the bearing and its related confidence, while the data receiver 92 preferably determines the associated code, such as identification code, verification code and movement code. The sensitivity of the data receiver 92 can be less than that of the direction finding receiver 90 and, accordingly, an optional high gain antenna array 94 may be connected to the input of the data receiver 92.

The channel information from the command information processor 40 and the data return to the command and control processor 40 are preferably in serial data form, and can be sent via fixed lines or radio links. As further shown and preferred in FIG. 4, the direction finding receiver station 44, also includes the direction finding antenna array 96, conventional antenna unit 98, a processing circuit 100 associated with the direction finding receiver 90, a demodulator 102 associated with the data receiver 92, and a control unit 104 which serves as the common local oscillator. As shown and preferred in FIG. 1, one of the direction finding receiver stations 46 may preferably be located within the central station 20 although this is not essential. If desired, all of the direction finding receiver stations 44, 46 and 48 can be remotely located from the central station 20 and the scanning receiver 42 and the command transceiver 52 can be located at any one of the direction finding receiver stations 44, 46, 48.

Referring now to FIG. 5, a block diagram of a typical mobile target tracker for use in the system for the present invention is shown. As shown and preferred, the configuration of the mobile target tracker is preferably similar to that of the direction finding receiver stations 44 and 48 located at the outstations. However, the mobile target tracker is preferably mounted in a vehicle, and presents a 360° display, preferably, with confidence of the direction of the received signal and preferably comprises three sub units; namely the antenna assembly 110 and its associated antenna unit 112, the receiver unit which, like the direction finding receiver station 44 comprises the direction finding receiver 114, and associated processing circuit 116, a data and audio receiver 118, and associated demodulator 120; and a control and display unit 122. The antenna assembly 110 preferably comprises four whip antennas mounted on the roof of the tracking vehicle, but, if desired, may be a hidden antenna configuration. The antenna assembly 110 is connected to the receiver units 114, 118 which are preferably installed in the rear of the tracking vehicle. As for the control and display unit 122, this is preferably a conventional small hand held unit which may be installed in the front of the tracking vehicle. On receipt of a message from a central control or at the operator's discretion, the operator can select the appropriate channel. If within range of the vehicle transceiver unit 30, the mobile target tracker will preferably display the direction of the unit 30, the identification code, and whether the target vehicle 28 is moving or stationery. As was previously mentioned, if desired, the display can be inhibited if the verification code has not been changed to the verified state or, alternatively, the verification code itself can be displayed alongside the vehicle 28 being tracked. In the case of two or more active units 30 on the same channel, the mobile operator is able to select the required identification code and then only the information related to that particular vehicle transceiver unit 30 will be displayed by the control and display unit 122. Of course, although the mobile target tracker has been described with respect to being mounted in a tracking vehicle, it may also be mounted in a helicopter or a boat by way of example.

Figure 6:
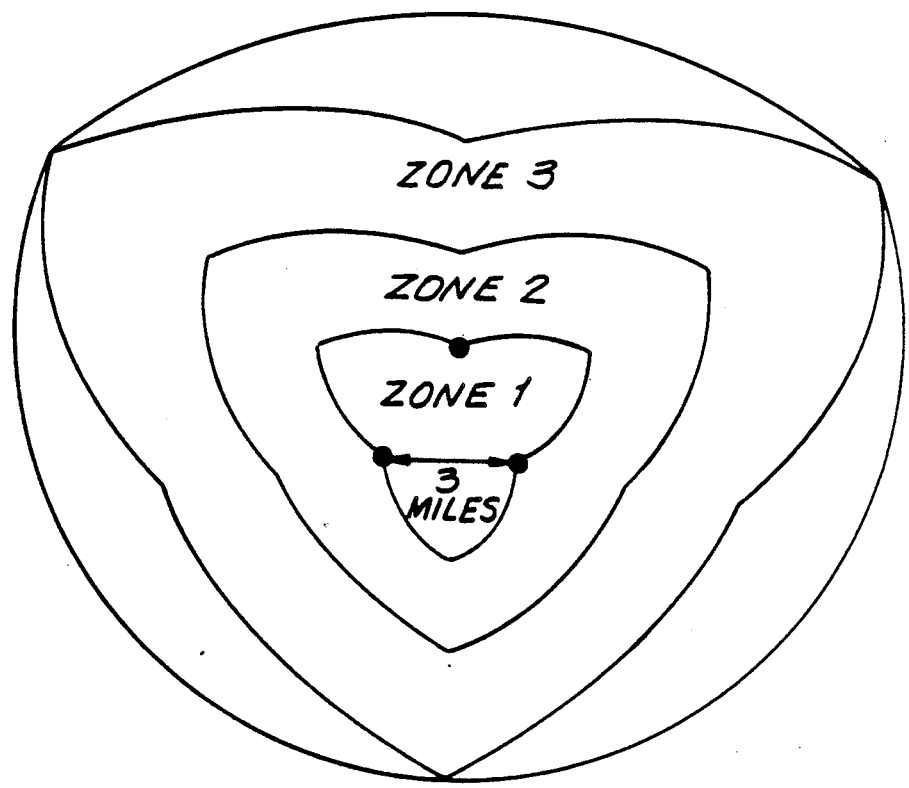
FIG. 6 is an illustrative diagram of typical coverage of a typical fixed site system in accordance with the present invention.
Figure 7:
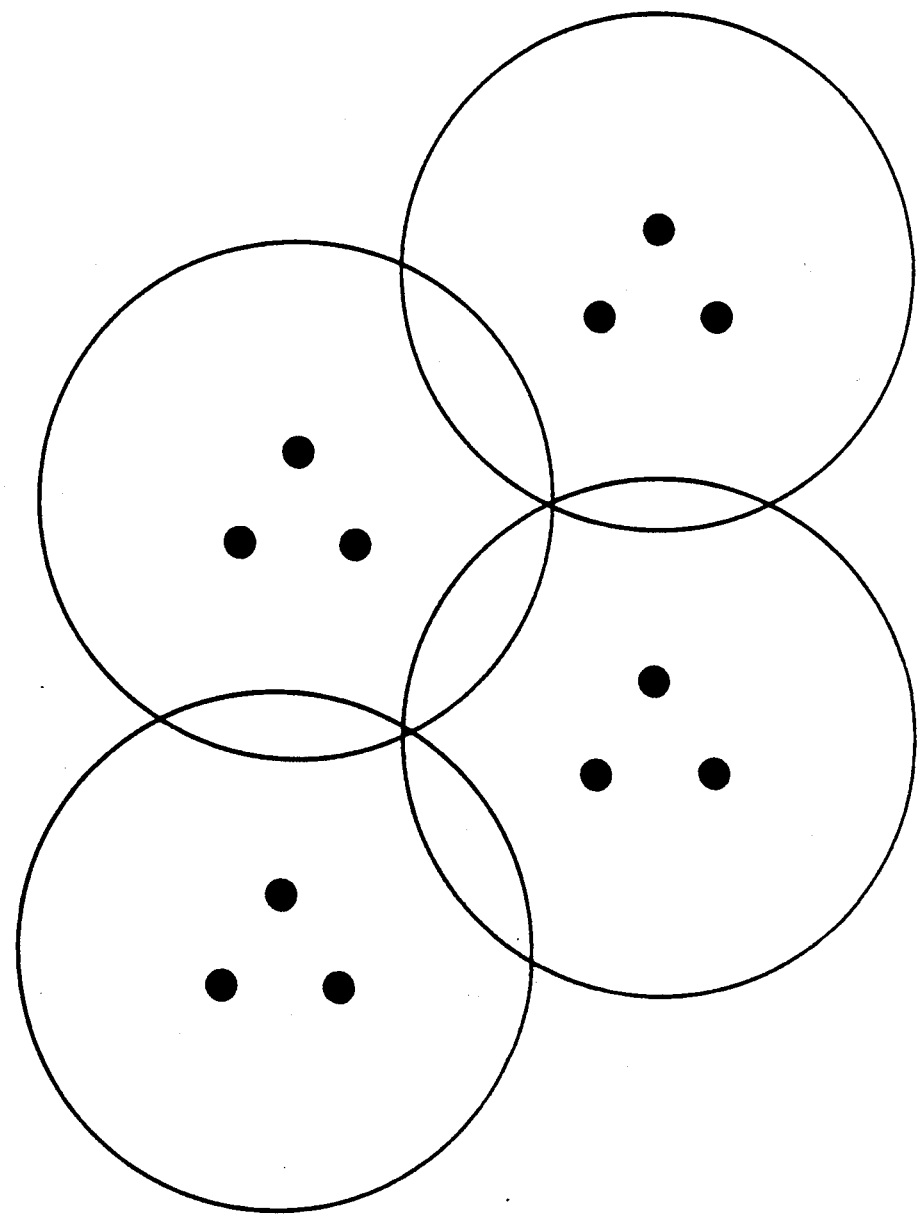
FIG. 7 is an illustrative diagram of a large area system using four three station systems of the type illustrated in FIG. 6 in accordance with the present invention.
Figure 8:
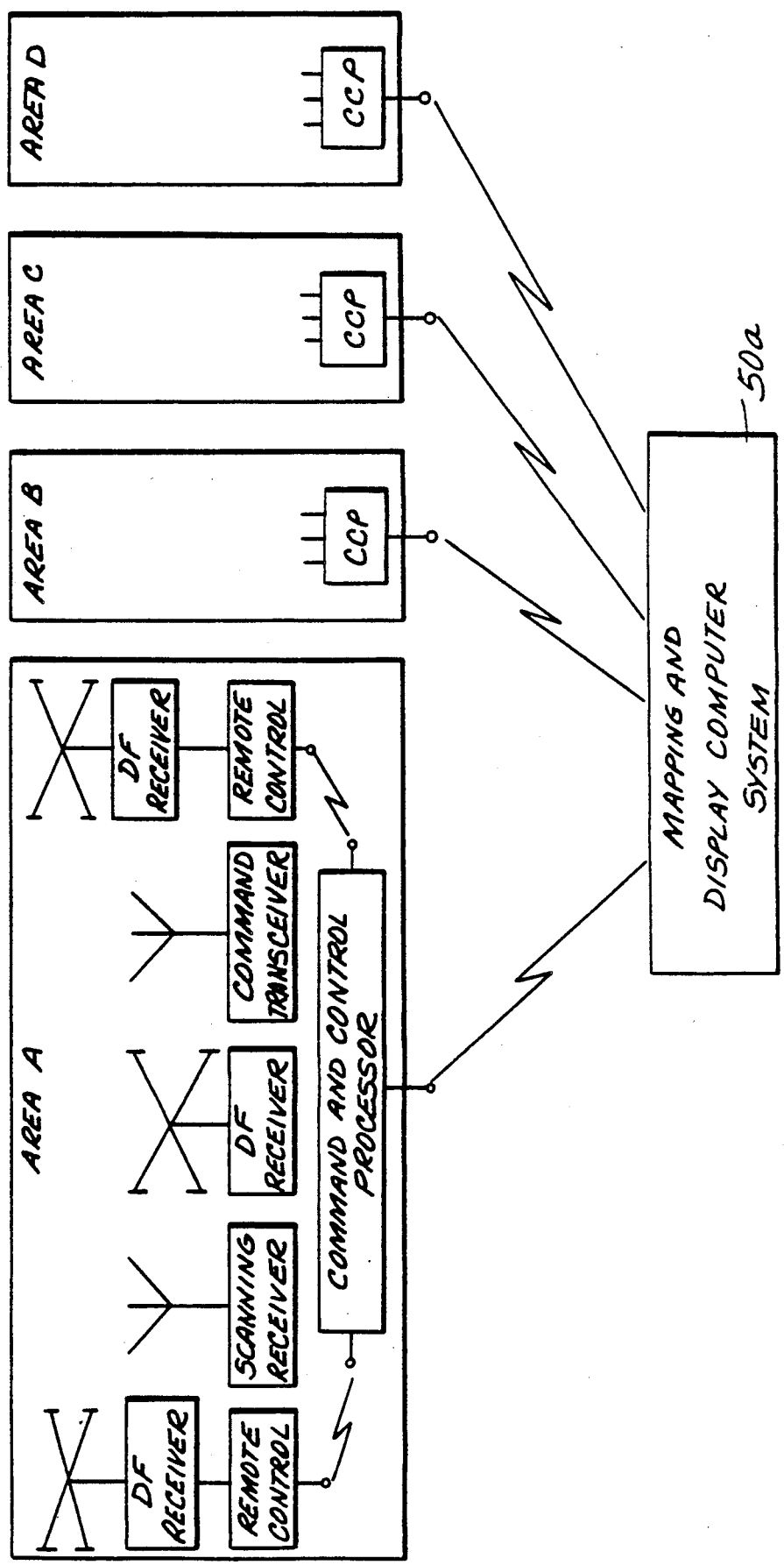
FIG. 8 is a block diagram, similar to FIG. 1, illustrating the system layout, similar to FIG. 1, for use with the large area system of FIG. 7 in accordance with the present invention.

Referring now to FIG. 6, this figure shows the typical coverage of a fixed-site system in which there are multiple zones of coverage, with zone 1, by way of example, being within a range of three miles of two sites, zone 2 being within a range of 6 miles of two sites, and zone 3 being within a range of 9 miles of three sites. Alternatively, FIG. 7 illustrates, by way of example, a larger area covered by four three station systems of the type illustrated in FIG. 1, with the areas of coverage overlapping. In a large area system, the direction finding receiver stations 44, 46 and 48, would have a range dependent upon the site and the topography of the region. By way of example, a typical direction finding receiver station 44, 46, or 48 would have a range of 10 to 13 miles. In such an example, a three station system such as shown in FIG. 1, would have a typical area coverage approximating a circle of 16 miles in diameter, such as shown in FIG. 6. As was previously mentioned, in order to cover a larger area, the groups of the three station systems would be overlapping, such as illustrated in FIG. 7, and would comprise a system such as illustrated, by way of example, in FIG. 8 in which multiple systems similar to the system previously described with reference to FIG. 1, are shown, one for each of the four areas A, B, C and D, with a common mapping and display computer system 50A being employed in place of one mapping and display computer 50 for each of the four areas separately. Of course, antenna elevation heights and local terrain will affect the coverage diameters of each sub-system of a large area system, such as illustrated in FIG. 7.

With the system of the present invention, preferably all of the direction finding receiver stations 44, 46 and 48 can be controlled by one central station 20. In this case, each area is controlled by its command and control processor 40 which, in turn, is controlled by the operator at the mapping and display computer 50. In this larger system, the mapping and display computer system 50 would be sized accordingly and would have several work stations depending on the area of coverage. If desired, it is possible to combine the areas, where multiple areas are involved, in any way such that one mapping and display unit 50 controls 1, 2, 3 or more areas while other mapping and display units 50 control other combinations of areas. Thus, the total system can be organized to suit the stolen vehicle pattern or, for example, the population pattern of any particular city or area, and the system may be easily expanded.

It should be noted that, preferably, unless otherwise described, all of the component parts of the system of the present invention employ conventional components and conventional programming of the type previously employed by METS in its Fleet Management System and in the aforementioned U.S. Patents and co-pending Patent Application incorporated by reference herein. Any modification thereto in accordance with the system of the present invention would be apparent to one of ordinary skill in the art from the foregoing description. Thus, by utilizing the system of the present invention, individual stolen vehicles may be tracked and monitored with their positions being displayed on a multi-level map in a hierarchical geographic display area, may have the verification of stolen or unstolen status of the vehicle also displayed, may track vehicles prior to verification of being stolen and store such tracking information for further use should such vehicle be subsequently identified as being stolen, and may be tracked from the instant that the vehicle is moved without acknowledgment of proper authorization as opposed to first requiring verification before any tracking can be accomplished.

It should be further noted that the system 20 of the present invention may also be embodied in a cellular telephone version, such as one combining LORAN-C and/or cellular triangulation. In the first instance, assuming the system 20 embodied LORAN-C in a cellular telephone version, as in the previously described system 20, the alarm would normally be deactivated by the owner or authorized user of the vehicle providing the appropriate authorization code for disarming the previously set alarm. If, however, the alarm is not deactivated in the appropriate verification interval, then the cellular telephone in the vehicle 28 would act as the vehicle transceiver 30 and would automatically dial-up and transmit LORAN-C coordinates to the central station, similar to the manner in which a home burgular system alerts a central station 22 of unauthorized entry. The central station 22 would then verify the alarm with the owner of the vehicle and, after confirmation, would then link the stolen vehicle transmission to the police department for tracking on the aforementioned mapping system 50. Of course, as previously mentioned, tracking by the central station 22 may commence from the initiation of the unauthorized entry transmission so as to provide an instantaneous record of movement if desired. If triangulation is desired using a cellular telephone as the vehicle transmitter 39, then the actual cellular telephone transmission would be triangulated instead of the target beacon. In any event, the principles of the above invention previously described with reference to FIGS. 1–8 are equally applicable to such a cellular version of the system 20 of the present invention.

What is claimed is:

1. A stolen vehicle recovery system for enabling prompt monitoring of unauthorized use of a vehicle, said system comprising a vehicle transceiver means disposed on said vehicle, said vehicle transceiver means comprising
  means for transmitting a pulsed signal of length T1 seconds every T2 seconds, said transmitted pulsed signal being modulated by a data stream comprising a unique identity code associated with said vehicle, said vehicle transceiver means further comprising
  owner verification means, said owner verification means comprising
    authorization sensor means, for providing a sensor input signal from a user of said vehicle;
    deactivation means for providing an authorization signal in response to a predetermined sensor input signal;
  means for automatically initiating transmission of said pulsed signal by said transmitting means when said authorization signal is not provided by said deactivation means within a predetermined authorization interval;
  scanning receiver means for receiving said transmitted pulsed signal and decoding said received signal for providing a decoded signal;
  control processor means for receiving said decoded signal for providing a control signal in response thereto;

direction finding receiver means comprising remotely located direction finding receiver means spaced apart in a pattern for enabling triangulation detection of a dynamic position of said vehicle in a detection area from said transmitted pulsed signal, said direction finding receiver means comprising means for measuring the bearing, signal strength and time variation of said bearing associated with said detected vehicle identity code for providing said measured data to said control processor means, said control processor means comprising means for verifying said identity code and providing a vehicle positional information signal comprising said measured bearing and signal strength data; and means disposed at a central station and linked to said control processor means for producing a displayable digitized street or terrain map of said detection area with said detected vehicle position being dynamically displayed thereon in a digitized map presentation, said digitized map presentation being updateable as said vehicle positional information varies, said control processor means further comprising means for interrogating said direction finding receiver means and verifying said vehicle identity code until said alarm condition is removed.

2. A stolen vehicle recovery system in accordance with claim 1 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

3. A stolen vehicle recover system in accordance with claim 2 wherein said direction finding receiver means dwell time of T3 seconds is longer than T2 seconds whereby T2 is the pulse repetition time of said vehicle transmitting means for a given vehicle.

4. A stolen vehicle recovery system in accordance with claim 3 wherein said scanning receiver means is continually tuned in sequence to each of said sub-channels with a dwell time corresponding to said direction finding receiver means dwell time, wherein each received signal is decoded and provided to said control processor means.

5. A stolen vehicle recovery system in accordance with claim 2 wherein said scanning receiver means is continually tuned in sequence to each of said sub-channels.

6. A stolen vehicle recovery system in accordance with claim 5 wherein said continually tuned scanning receiver means has a dwell time of said T3 seconds for each sub-channel 7. A stolen vehicle recovery system in accordance with claim 6 wherein said scanning receiver means dwell time of T3 seconds is longer than said T2 seconds pulse repetition time of said vehicle transmitting means for a given vehicle.

8. A stolen vehicle recovery system in accordance with claim 2 wherein said central station means comprises means for dynamically displaying a plurality of different stolen vehicle positions on said displayable digitized street or terrain map of said detection area in said digitized map presentation, whereby a plurality of detected vehicles in said detection area may be simultaneously monitored on a common display map of said area.

9. A stolen vehicle recovery system in accordance with claim 3 wherein said central station means comprises means for dynamically displaying a plurality of different stolen vehicle positions on said displayable digitized street or terrain map of said detection area in said digitized map presentation, whereby a plurality of detected vehicles in said detection area may be simultaneously monitored on a common display map of said area.

10. A stolen vehicle recovery system in accordance with claim 9 wherein said scanning receiver means is continually tuned in sequence to each of said sub-channels with a dwell time corresponding to said direction finding receiver means dwell time, wherein each received signal is decoded and provided to said control processor means.

11. A stolen vehicle recovery system in accordance with claim 5 wherein said central station means comprises means for dynamically displaying a plurality of different stolen vehicle positions on said displayable digitized street or terrain map of said detection area in said digitized map presentation, whereby a plurality of detected vehicles in said detection area may be simultaneously monitored on a common display map of said area.

12. A stolen vehicle recovery system in accordance with claim 11 wherein said continually tuned scanning receiver means has a dwell time of said T3 seconds for each sub-channel.

13. A stolen vehicle recovery system in accordance with claim 12 wherein said scanning receiver means dwell time of T3 seconds is longer than said T2 seconds pulse repetition time of said vehicle transmitting means for a given vehicle.

14. A stolen vehicle recovery system in accordance with claim 1 wherein said transmitting means comprises means for further modulating said pulsed signal with a code corresponding to whether said detected vehicle is moving or stationary for providing said transmitted signal.

15. A stolen vehicle recovery system in accordance with claim 14 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for turning said direction finding receiver means in turn to the corresponding sub-channels associated with said received transmitted signals, said direction finding receiver means panning the active sub-channels in said channel with a dwell time on each of said sub-channels of T3 seconds.

16. A stolen vehicle recovery system in accordance with claim 1 wherein said vehicle transceiver means further comprises means responsive to a remote command signal for remotely activating or deactivating said transmitting means.

17. A stolen vehicle recovery system in accordance with claim 1 wherein said displayed vehicle positional information in said digitized map presentation comprises the relative position of said detected vehicle on said map presentation and the identity of said displayed vehicle.

18. A stolen vehicle recovery system in accordance with claim 17 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds, said identity and said relative displayed position being provided for each detected vehicle in said detection area.

19. A stolen vehicle recovery system in accordance with claim 1 wherein data communication with said control processor means comprises a serial data format.

20. A stolen vehicle recovery system in accordance with claim 19 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

21. A stolen vehicle recovery system in accordance with claim 1 wherein said direction finding receiver means further comprises one of said measuring means disposed at said central station.

22. A stolen vehicle recovery system in accordance with claim 21 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

23. A stolen vehicle recovery system in accordance with claim 1 wherein said antenna array in said detection area provides a plurality of expanding coverage detection areas, said central station means comprising means for zooming said digitized map presentation within said detection areas.

24. A stolen vehicle recovery system in accordance with claim 23 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

25. A stolen vehicle recovery system in accordance with claim 1 wherein said central station means comprises means for zooming said digitized map presentation over a hierarchical geographic display area.

26. A stolen vehicle recovery system in accordance with claim 25 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

27. A stolen vehicle recovery system in accordance with claim 1 wherein said direction finding receiver means comprises a plurality of antenna arrays having overlapping detection areas.

28. A stolen vehicle recovery system in accordance with claim 27 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

29. A stolen vehicle recoverY system in accordance with claim 1 wherein said data stream further comprises a verification code for indicating the stolen status of the detected vehicle.

30. A stolen vehicle recovery system in accordance with claim 29 wherein said verification code comprises a two state code, one of said verification states being an unverified state, the other of said verification states being a verified state in which an indication is provided that said detected vehicle is a stolen vehicle.

31. A stolen vehicle recovery system in accordance with claim 30 wherein said verification code is initially set to said unverified state when said vehicle transmission is initiated.

32. A stolen vehicle recovery system in accordance with claim 31 wherein said verification code is changed from said unverified state to said verified state in response to detection of a remotely transmitted command signal.

33. A stolen vehicle recovery system in accordance with claim 29 wherein said system comprises means for monitoring unauthorized use of a plurality of vehicles in said detection area, each of said vehicles having a unique identity code associated therewith, said system further comprising a plurality of said vehicle transceiver means, a different one of said vehicle transceiver means being disposed on each of said plurality of vehicles for providing said transmitted pulsed signal modulated by said data stream comprising said unique identity code associated with said vehicle on which said one vehicle transceiver means is disposed, said transmitting means transmitting over a channel, a plurality of said transmitting means transmitting on different sub-channels of said channel, said control processor means providing a control signal to said direction finding receiver means for tuning said direction finding receiver means in turn to the corresponding sub-channels associated with said received transmitted signals, said direction finding receiver means scanning the active sub-channels in said channel with a dwell time on each of said sub-channels of T3 seconds.

34. A stolen vehicle recovery system in accordance with claim 33 wherein said verification code comprises a two state code, one of said verification states being an unverified state, the other of said verification states being a verified state in which an indication is provided that said detected vehicle is a stolen vehicle.

35. A stolen vehicle recovery system in accordance with claim 34 wherein said verification code is initially set to said unverified state when said vehicle transmission is initiated.

36. A stolen vehicle recovery system in accordance with claim 35 wherein said verification code is changed from said unverified state to said verified state in response to detection of a remotely transmitted command signal.

37. A stolen vehicle recovery system in accordance with claim 1 wherein said vehicle transceiver means comprises a cellular telephone means.

38. A stolen vehicle recovery system in accordance with claim 2 wherein said vehicle transceiver means comprises a cellular telephone means.

39. A stolen vehicle recovery system in accordance with claim 3 wherein said vehicle transceiver means comprises a cellular telephone means.

40. A stolen vehicle recovery system in accordance with claim 4 wherein said vehicle transceiver means comprises a cellular telephone means.

41. A stolen vehicle recovery system in accordance with claim 5 wherein said vehicle transceiver means comprises a cellular telephone means.

42. A stolen vehicle recovery system in accordance with claim 17 wherein said vehicle transceiver means comprises a cellular telephone means.

43. A stolen vehicle recovery system in accordance with claim 18 wherein said vehicle transceiver means comprises a cellular telephone means.

* * * * *

UNITED STATES PATENT AND TRADEMARK OFFICE
CERTIFICATE OF CORRECTION

PATENT NO. : 5,003,317

DATED : March 26, 1991

INVENTOR(S) : DONALD R. GRAY et al.

It is certified that error appears in the above-identified patent and that said Letters Patent is hereby corrected as shown below:

Column 1, line 47: Change "vehicles," to --vehicle,--.

Column 2, line 59: Change "sytem" to --system--.

Column 3, line 17: Delete "it isn't".

Column 8, line 57: Change "stationery." to --stationary.--.

In the claims,

Column 11, line 55: In claim 3, change "recover" to --recovery--.

Column 15, line 8: In claim 26, after "vehicle transceiver" insert --means is disposed,--.

Column 15, line 45: In claim 29, change "recoverY" to --recovery--.

Signed and Sealed this

Ninth Day of February, 1993

Attest:

STEPHEN G. KUNIN

Attesting Officer

Acting Commissioner of Patents and Trademarks